United States Patent
Hill et al.

(10) Patent No.: US 8,964,258 B2
(45) Date of Patent: Feb. 24, 2015

(54) SCANNERS AND SCANNER HOUSINGS

(75) Inventors: Edward A. Hill, Oceanside, CA (US); Donald G. Harris, San Diego, CA (US); John H. Arterberry, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 347 days.

(21) Appl. No.: 13/222,976

(22) Filed: Aug. 31, 2011

(65) Prior Publication Data

US 2013/0050768 A1 Feb. 28, 2013

(51) Int. Cl.
*H04N 1/04* (2006.01)
*H04N 17/02* (2006.01)
*G06K 7/10* (2006.01)
*H04N 1/024* (2006.01)

(52) U.S. Cl.
CPC .... *H04N 1/0249* (2013.01); *H04N 2201/02404* (2013.01); *H04N 2201/02454* (2013.01); *H04N 2201/02485* (2013.01); *H04N 2201/02495* (2013.01)
USPC ....... 358/474; 358/475; 348/187; 235/462.36

(58) Field of Classification Search
None
See application file for complete search history.

(56) References Cited

U.S. PATENT DOCUMENTS

| | | | | |
|---|---|---|---|---|
| 5,329,103 | A * | 7/1994 | Rando | 235/462.36 |
| 6,527,180 | B1 | 3/2003 | Dvorkis et al. | |
| 6,637,657 | B2 | 10/2003 | Barkan et al. | |
| 6,702,184 | B2 | 3/2004 | Dvorka et al. | |
| 7,225,987 | B2 | 6/2007 | Swartz et al. | |
| 7,535,602 | B2 * | 5/2009 | Ohara | 358/474 |
| 7,884,974 | B2 * | 2/2011 | Osakabe | 358/471 |
| 8,085,449 | B2 * | 12/2011 | Yoshimura | 358/475 |
| 2006/0045149 | A1 | 3/2006 | Kasai | |
| 2010/0085434 | A1 * | 4/2010 | Stewart | 348/187 |

* cited by examiner

*Primary Examiner* — Fred Guillermety
*Assistant Examiner* — Frantz Bataille

(57) ABSTRACT

Scanners and scanner housings are disclosed. An example scanner includes a housing to carry an optical element, the housing having a first support feature, and a printed circuit board having a second support feature to mate with the first support feature of the housing, the printed circuit board to provide vertical support to the housing when the first and second support features are mated.

20 Claims, 4 Drawing Sheets

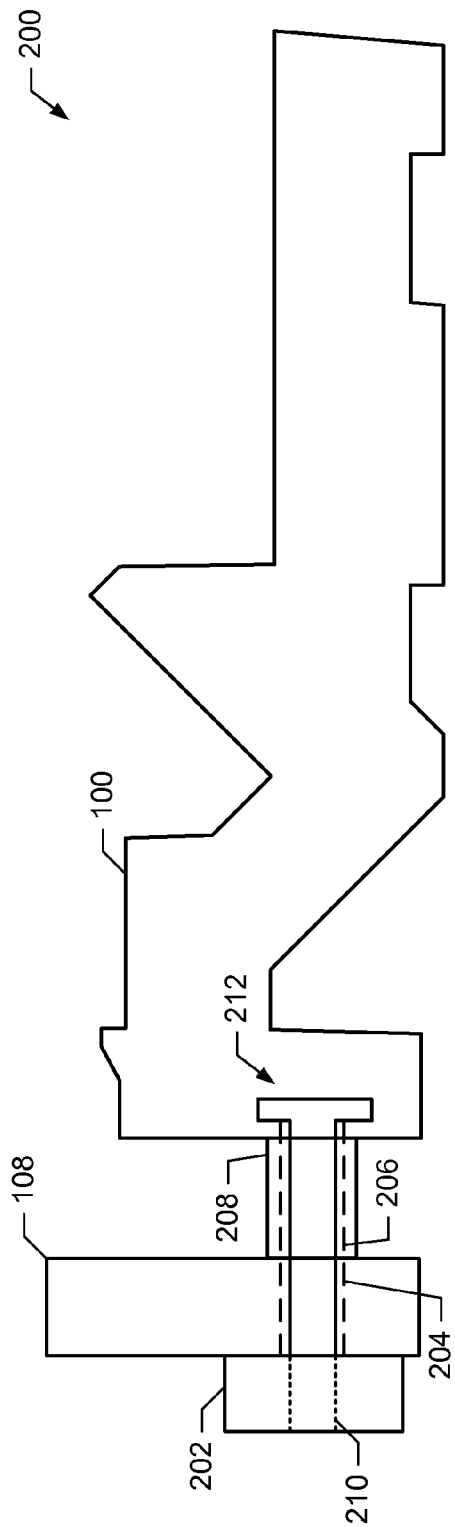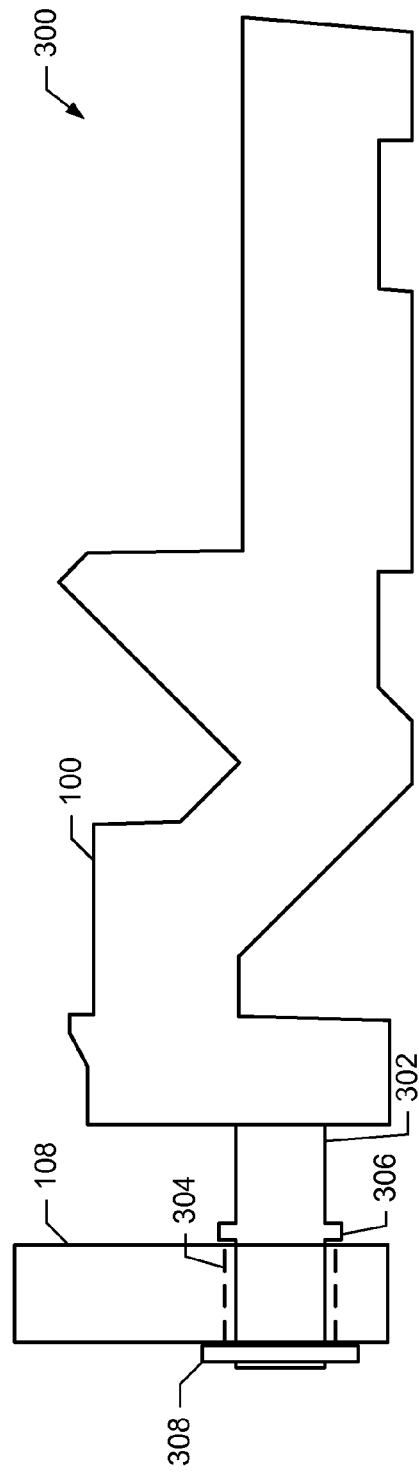

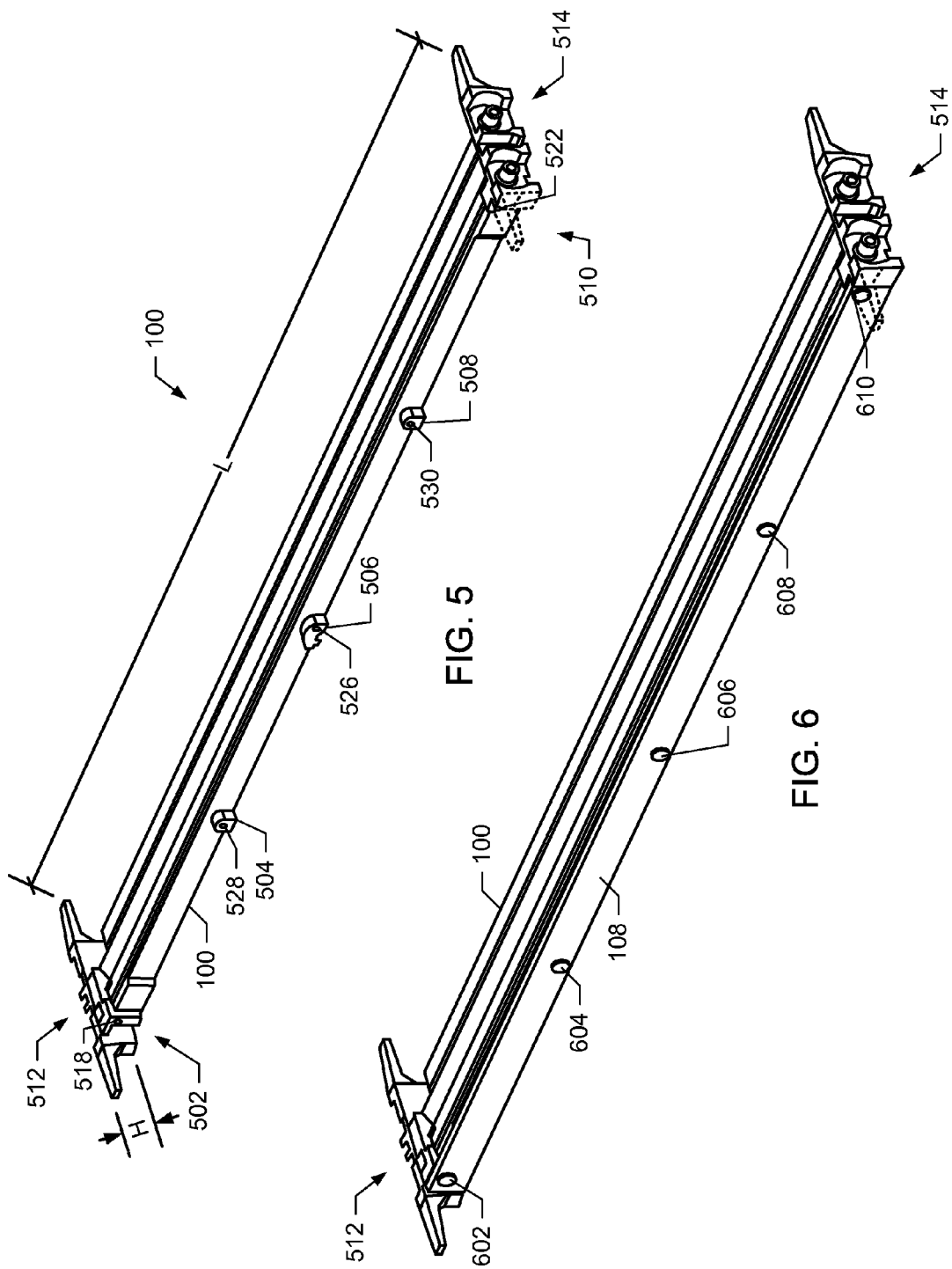

SCANNERS AND SCANNER HOUSINGS

BACKGROUND

Image scanners generate electronic versions representative of a scanned object (e.g., a document). Known image scanners illuminate the scanned object with a light source and use photo-sensitive transducers to generate image information, such as pixel data, representative of the scanned object.

BRIEF DESCRIPTION OF THE DRAWINGS

FIG. 2 illustrates another example scanner including a scanner housing and a printed circuit board constructed in accordance with the teachings of this disclosure.

FIG. 3 illustrates yet another example scanner including a scanner housing and a printed circuit board constructed in accordance with the teachings of this disclosure.

FIG. 5 is a perspective view of the example scanner housing of FIGS. 1A-4.

FIG. 6 is a perspective view of the example scanner housing of FIGS. 1A-4 and the example printed circuit board of FIGS. 1B, 2, 3, and 4.

DETAILED DESCRIPTION

Known scanners and optical scanning assemblies employ relatively thick housings (e.g., 10 millimeters (mm) or more) into which optical elements are mounted. These known scanners and optical scanning assemblies also include electronic processing elements mounted on printed circuit boards (PCBs), where the PCBs connect the various electronic components.

To achieve a reduced profile, example scanners and scanning assemblies disclosed herein employ a housing having a reduced thickness. In some examples, the thickness of the housing is reduced to such an extent that molding the housing to tight flatness tolerances is prohibitively expensive. To address this issue, a PCB is mounted to the housing to provide additional stiffness to compensate for a low stiffness of the housing. In some examples, the PCB has at least one bending direction that is substantially stiffer than other bending directions, and the PCB is mounted to the housing such that the stiffness of the PCB in the stiffer bending direction compensates for the low stiffness of the housing. In some examples, the PCB includes the electronic processing components. As a result of this combination of elements, example scanners and scanning assemblies provide a very thin scanner that is sufficiently flat for optical applications. In some examples, the PCB reduces a mechanical deflection or bending of the housing to less than about 0.1 mm. Bending is measured as the highest linear deflection from flat that may occur anywhere along the length of the housing.

As used herein, the terms "slot" and "hole" are used interchangeably, and do not imply or refer to any particular number, type, depth, or shape of openings.

Figure 1A:
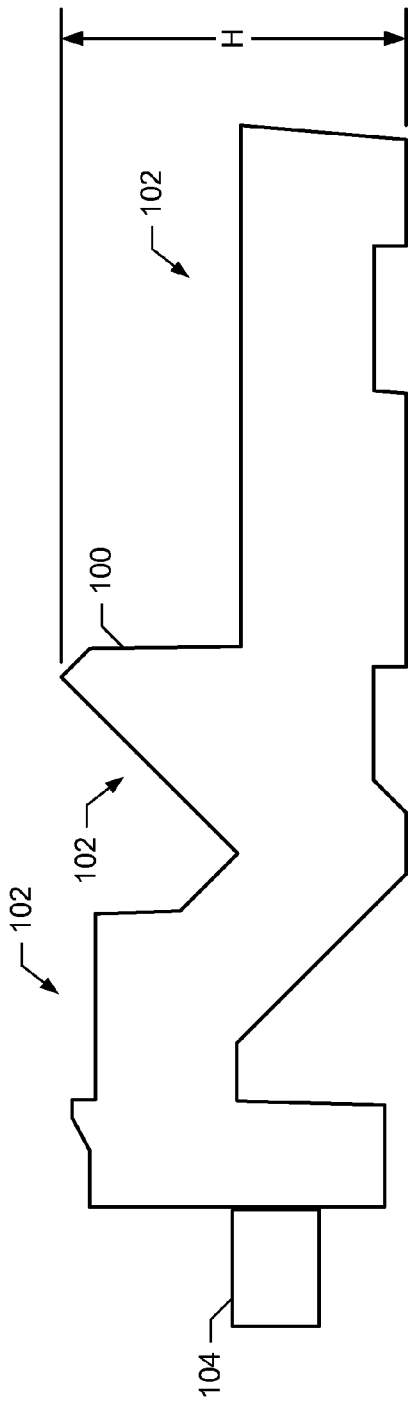
FIG. 1A is a cross-sectional view of an example scanner housing constructed in accordance with the teachings of this disclosure.

FIG. 1A illustrates an example scanner housing 100. The example scanner housing 100 of FIG. 1A may be used to support optical and/or electronic components for use in an image scanner. FIG. 1A is a cross-sectional view of the example housing 100.

The example housing 100 of FIG. 1 includes optical component support(s) 102 to support optical components of, for example, an image scanner. Example optical components include light sources (e.g., light emitting diodes (LEDs), lamps, etc.), a reflective element (e.g., mirror(s)) to reflect light, and/or other optical elements included in an image scanner.

The example scanner housing 100 of the illustrated example is constructed using relatively inexpensive materials and/or techniques to reduce a cost of manufacture. In some examples, the housing 100 is constructed using molded thermoplastic and/or molded thermoset plastic. The example housing 100 of FIG. 1A is thin compared to known scanner housings, and has a height dimension H less than 6 mm. Due, at least in part, to the thinness of the housing 100, the example housing has a relatively low stiffness. When the housing 100 is mounted in an image scanner (e.g., as a beam supported at one, two, or more points), the downward force of gravity on the housing 100 causes the housing 100 to deflect (bend) because the housing 100 has insufficient stiffness to maintain a flatness suitable for image scanning. In some examples, the housing 100 deflects enough, under a combination of its own weight, stresses and/or forces due to mounting the housing 100, and/or stresses and/or forces due to positioning the housing 100, to cause distortion (e.g., substantial distortion) of a scanned image. In some such examples, substantial distortion of a scanned image results from a deflection of at least 0.1 mm in a housing having a length of 216 mm (about 8.5 inches). The length L of the housing 100 refers to its longest dimension, and is illustrated in FIG. 5.

The example scanner housing 100 of FIG. 1A further includes support feature(s) 104 (e.g., support points, tabs, holes, slots, pins, etc.). The scanner housing 100 and a PCB are to be mated via the feature(s) 104, which are to transfer at least a portion of the vertical load(s) (downward and/or upward force(s) and/or stress(es)) on the scanner housing 100 (causing the deflection) to the PCB, as described in more detail below. Individual vertical load(s) on the housing 100 and/or the net vertical load on the housing 100 may bend the housing 100 downward or upward and include, for example, the weight of the housing 100, molding stresses on the housing 100, and/or mounting forces on the housing 100. By transferring the vertical force(s) and/or stress(es) from the housing 100 to a PCB, the housing 100 has a reduced deflection and is therefore flatter. Although only one support feature 104 is shown in FIG. 1A, the example housing 100 may include three or more such features (e.g., 3, 4, 5, or more).

Figure 1B:
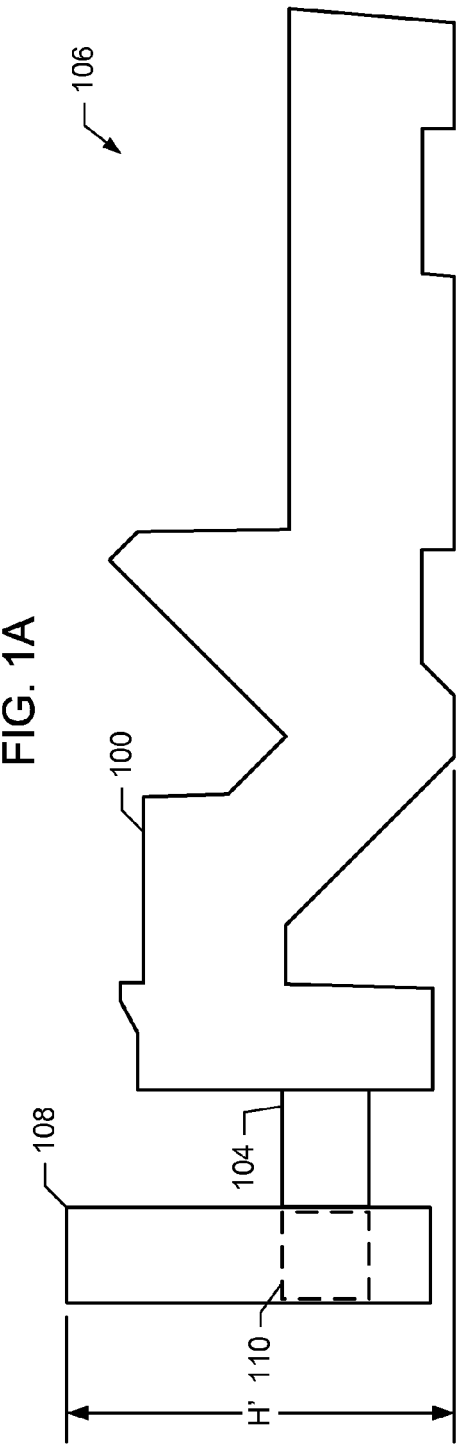
FIG. 1B illustrates an example scanner including the scanner housing of FIG. 1A and a printed circuit board.

FIG. 1B illustrates an example scanner 106 including the example scanner housing 100 of FIG. 1A. The scanner 106 of FIG. 1B may be used to implement, for example, a charge-coupled device (CCD) scanner, a contact image sensor (CIS) scanner, and/or any other type of scanner that can benefit from having a relatively thin physical size. FIG. 1B is a cross-sectional view of the example scanner 106. The example scanner of FIG. 1B also includes a PCB 108. The example PCB 108 supports electronic elements such as image sensors, light-sensitive components, image processing components, and/or other accompanying electronic components.

As discussed above, the example housing 100 includes a first support feature 104. The example PCB 108 is attached, mated, joined, and/or otherwise coupled to the housing 100 via the support features 104. To mate the PCB 108 to the support features 104, the example PCB 108 includes a second support feature 110 (e.g., a mating point, a slot, a hole, a tab, etc.). In the example of FIG. 1B, the PCB 108 includes at least three second support features 110 to be mated to corresponding ones of the first support features 104. In some examples, the first support feature(s) 104 are tab(s) and the second support feature(s) 110 are slot(s) to receive corresponding ones of the tab(s). In other examples, the second feature(s) 110 are tab(s) and the first support feature(s) 104 slot(s) to receive corresponding ones of the tab(s). When mated, the tabs and slots transfer at least a portion of a vertical load from the housing 100 to the PCB 108, to thereby flatten the housing 100. In some examples, the PCB 108 can flatten the housing 100 which would otherwise bend in the downward direction and/or the upward direction.

In the example of FIG. 1B, the PCB 108 has at least one bending direction that is substantially stiffer than other bending directions, and the PCB 108 is mounted to the housing 100 such that the stiffness of the PCB 108 in the stiffer bending direction compensates for the low stiffness of the housing 100.

The PCB 108 of the illustrated example includes a combination of one or more conductive trace(s) and one or more dielectric layer(s) to electrically separate the conductive trace(s). In general, the conductive trace(s) connect two or more electrical components on the PCB 108. The dielectric layer(s) are constructed using a stiff dielectric material. In the example of FIG. 1B, the dielectric material resists deflection under the vertical forces and/or stresses on the combination of the scanner housing 100 mated to the PCB 108. As a result, the PCB 108 lends stiffness to the scanner housing 100 to thereby establish and/or maintain a flatness of the scanner housing 100 (e.g., reduce a deflection of the scanner housing 100) to within a range (e.g., 0 mm to 0.1 mm) suitable for image scanning applications.

In some examples, the height H' of the PCB 108 and the housing 100 is less than about 6 mm (e.g., at the tallest point of the PCB 108 and/or the housing 100). Having a combined height H' enables the example scanner 106 to be used in image scanners that are thinner than known image scanners.

FIG. 2 illustrates another example scanner 200. The example scanner 200 of FIG. 2 includes the housing 100 and the PCB 108 of FIGS. 1A, 1B. In the example of FIG. 2, the housing 100 is mated to the PCB 108 using a fastener, such as a push rivet 202. The push rivet 202 of the illustrated example is inserted through a support feature 204 (e.g., a first hole or slot) in the PCB 108 and into a second feature 206 (e.g., a second slot) in the housing 100. In the illustrated example of FIG. 2, the second feature 206 is a slot in or through a mating point 208 such as a protrusion.

To mate the housing 100 and the PCB 108 using the example push rivet 202, the first feature 204 of the illustrated example is aligned with the second feature 206 and the push rivet is inserted into the first and second features 204, 206. A mandrel 210 through the push rivet 202 is then pushed from the head end of the mandrel 210 to buck (e.g., expand) the tail end 212 within the housing 100, thereby locking the PCB 108 to the housing 100. The scanner 200 of the illustrated example includes additional push rivets 202, first features 204, second features 206, and/or mating points 208 to provide at least three mating points between the housing 100 and the PCB 108. When the push rivets 202, first features 204, second features 206, and/or mating points 208 join the PCB 108 and the housing 100, the PCB 108 flattens the example housing 100, provides additional stiffness, and/or bears at least a portion of the vertical load on the housing 100.

FIG. 3 illustrates yet another example scanner 300. The example scanner 300 of FIG. 3 includes the housing 100 and the PCB 108 of FIGS. 1A, 1B, and/or 2. In the example scanner 300 of FIG. 3, the housing 100 includes a first feature 302 (e.g., a mounting pin), which is mounted into a second feature 304 (e.g., a hole or a slot) of the PCB 108. To mount the example PCB 108 to the housing 100, the first feature 302 is inserted through the second feature 304. The mating of the first feature 302 and the second feature 304 flattens the housing 100 and transfers at least a portion of the vertical load on the housing 100 to the PCB 108. The PCB 108 has a higher stiffness than the housing 100.

In the example of FIG. 3, the first feature 302 includes a shoulder 306 or other physical feature to limit the insertion of the first feature 302 through the second feature 304. Additionally, a locking ring 308 or other locking device is placed on the first feature 302 to prevent the first feature 302 from being unintentionally removed from the second feature 304 (which would decouple the housing 100 and the PCB 108).

Figure 4:
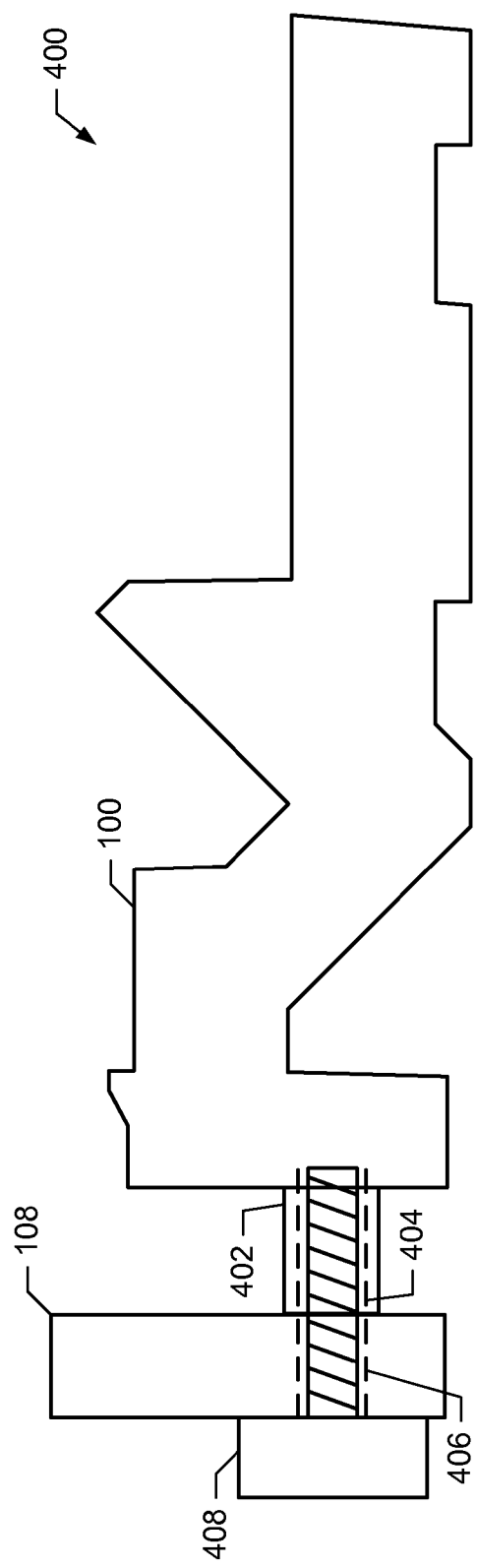
FIG. 4 illustrates still another example scanner including a scanner housing and a printed circuit board constructed in accordance with the teachings of this disclosure.

FIG. 4 illustrates yet another example scanner 400. Like the example scanner 200 of FIG. 2 and the example scanner 300 of FIG. 3, the example scanner 400 of FIG. 4 includes the scanner housing 100 of FIG. 4 and the PCB 108. The example housing 100 of FIG. 4 includes a first feature 402 (e.g., a projection) defining a threaded, unthreaded, or partially threaded hole 404. The example PCB 108 includes a corresponding second feature 406 (e.g., a threaded, unthreaded, or partially threaded hole, a slotted hole, etc.) to be aligned with the first feature 402 and/or the hole 404 of the first feature 402. The example screw 408 and the example PCB 108 of FIG. 4, in combination with additional fasteners, vertically flatten the housing 100 and bear at least a portion of the vertical load on the housing 100.

To mate the example PCB 108 to the housing 100 in the example scanner 400, a screw 408 (or other suitable fastener) is inserted and/or screwed into the first feature 402 and the second feature 406. The example first feature 402 (including the hole 404), the second feature 406, and the screw 408 of the illustrated example are duplicated along the lengths of the example housing 100 and the example PCB 108 to mate the housing 100 and the PCB 108 using three or more mating points. In some examples, using three or more mating points to mate the housing 100 and the PCB 108 transfers more stiffness from the PCB 108 to the housing 100 than using less than three mating points to mate the housing 100 and the PCB 108.

FIG. 5 is a perspective view of the example housing 100 of FIG. 1A. The view of the example housing 100 illustrated in FIG. 5 shows five (5) features 502, 504, 506, 508, 510 on the housing 100. The housing further includes spring mounting features 512, 514, which couple the example housing 100 to a scanner carriage (e.g., a component used to translate the scanner housing 100). In some examples, the spring mounting features 512, 514 are coupled to a motor to move the scanner housing 100 past an object to be scanned. In some examples, the spring mounting features 512, 514 may apply a vertical force on the housing 100 that would be sufficient to cause substantial deflection in the housing 100 without the PCB 108 mated to the housing 100.

The features 502, 510 of the illustrated example are positioned at opposite ends of the example housing 100. In the example housing of FIG. 5, a first one of the support points (e.g., the feature 502) is positioned within a first third of the length L of the housing 100 at a first end (e.g., near the mounting feature 512). A second one of the support points (e.g., the feature 510) is positioned within a second (e.g., last) third of the length L of the housing 100 at a second end opposite the first end (e.g., near the mounting feature 514). A third one of the support points (e.g., the feature 506) is positioned within a middle third of the length L of the housing.

The feature 506 of the illustrated example is positioned about halfway between the features 502, 510. The feature 502 of the illustrated example includes a slot 518 (e.g., a hole). The feature 510 of the illustrated example also includes a slot 522. The example feature 506 protrudes from the housing 100 and, like the example features 502, 510, includes a slot 526.

In the example of FIG. 5, the example support feature 504 is positioned about halfway between the support features 502, 506, and the example support feature 508 is positioned about halfway between the support features 506, 510. As illustrated in FIG. 5, the example support features 504 and 508 include protrusions from the housing 100. The example support feature 504 includes a slot 528 and the example support feature 508 includes a slot 530. The sizes of the example slots (e.g., holes) 518, 522, 526, 528, 530 are substantially the same, which decreases manufacturing complexity in some examples. Additionally or alternatively, the openings of the example holes 518, 522, 526, 528, 530 of FIG. 5 are parallel (e.g., flush with each other, existing in the same plane parallel to the openings) to facilitate connecting with a PCB (e.g., the PCB 108) to be mated with the housing 100.

FIG. 6 is a perspective view of the example housing 100 and the example PCB 108 of FIGS. 1B and 5. FIG. 6 illustrates the example PCB 108 mated to the example housing 100. The example housing 100 of FIG. 6 includes the support features 502, 504, 506, 508, 510 and the mounting features 512, 514 of FIG. 5.

As illustrated in FIG. 6, the example PCB 108 is mated to the housing 100 at 5 positions along the length L of the example housing 100. Push rivets 602, 604, 606, 608, 610 are inserted through holes in the PCB 108 and into respective ones of the slots 518, 522, 526, 528, 530. When the push rivets 602, 604, 606, 608, 610 are inserted, an inner mandrel of each push rivet is driven (or "popped") to flare out the inserted end of the push rivet, thereby substantially fixing the push rivet in place and mating the PCB 108 to the housing 100 at the respective feature 502, 504, 506, 508, 510. The push rivets 602, 604, 606, 608, 610 transfer at least a portion of the vertical forces and/or stresses on the housing 100 to the PCB 108. For example, NEMA FR-4 epoxy/glass construction resin, which can be used to construct the dielectric layer(s) of the PCB 108, has a flexural modulus of about 2,400,000 pounds per square inch (psi), whereas the housing 100 may be constructed using 20% fiberglass-filled polycarbonate molding-grade plastic, which has a flexural modulus of about 800,000 psi. The PCB 108 transfers at least a portion of its stiffness to the housing 100 via the push rivets 602, 604, 606, 608, 610. Additionally, the PCB 108 of the illustrated example is oriented such that the stiffer bending direction of the PCB 108 supports the weaker bending direction of the housing 100 (e.g., in the vertical direction). In the above example, the combination of the PCB 108 mated to the housing 100 is 2.7 times as stiff as the housing 100 alone. Thus, force(s) and/or stress(es) that would cause 0.27 mm of deflection in the housing 100 alone cause about 0.1 mm of deflection in the combination of the PCB 108 and the housing 100.

The example scanner housing 100 of FIGS. 5 and 6 has mounting features 512, 514 on opposite ends of the housing 100. These features 512, 514 provide a two-end support system for the housing 100 within an image scanner. However, other example scanners and scanner housings may have a single mounting feature (for mounting the housing 100 as a cantilever beam) and/or may have more than two mounting features.

In some examples, at least some of the features of the housing 100 and/or the PCB 108 are to remain mated when experiencing thermal expansion and/or thermal contraction of the housing 100 and/or the PCB 108. For example, a feature may be implemented using an laterally-elongated slot that permits a tab or fastener to slide laterally (e.g., in the direction of the length L of the housing 100) while supporting the tab or fastener vertically (e.g., in the direction of the vertical load on the housing 100). Thus, if thermal expansion or thermal contraction of the housing 100 and/or the PCB 108 occurs, the PCB 108 continues to bear at least a portion of the vertical load on the housing 100, thereby continuing to flatten the housing 100. In some examples, the PCB 108 expands and/or contracts at a different rate than the housing 100. In these examples, the features of the housing 100 and/or the PCB 108 are dimensioned to allow the scanner housing 100 to expand or contract at a different rate than the PCB 108 while substantially maintaining the flatness of the housing 100.

In some examples, at least one of the holes in the PCB 108 corresponding to the push rivets 602, 604, 606, 608, 610 (e.g., the push rivet 606) is a cylindrical hole (e.g., not elongated) to maintain a position of the PCB 108 relative to the housing 100, while the holes corresponding to the remaining push rivets 602, 604, 608, 610 are elongated holes or elliptical holes to allow the scanner housing 100 to expand or contract at a different rate than the PCB 108 while substantially maintaining the flatness of the housing 100. The example housing 100 is effectively pinned to the example PCB 108 at the location of the cylindrical hole, and thermal expansion and/or contraction emanates radially from the cylindrical hole. The largest translational mismatch between the housing 100 and the PCB 108 occurs at the points that are the furthest distance from the pinned location (e.g., the cylindrical hole). Therefore, translational mismatches due to differences in rates of thermal expansion and/or contraction between the example housing 100 and the example PCB 108 are reduced (e.g., minimized) by pinning the housing 100 to the PCB 108 at the midpoint or substantially the midpoint of the housing 100 and/or the PCB 108. However, the pinning point may alternatively be located at any of the example support features (e.g., the push rivets 602-610). At the pinning point, the hole in the PCB 108 is cylindrical while the holes in the PCB 108 corresponding to the other support features are, for example, elongated and/or elliptical.

While the example PCB 108 and the example housing 100 of FIG. 6 are mated using push rivets, other fasteners may additionally or alternatively be used. For example, and not to be considered limiting, pins, nails, screws, bolts, adhesives, clamps, and/or any other past, present, and/or future fastening, attaching, fixing, mounting, and/or mating device and/or method may be used to physically couple the housing 100 and the PCB 108.

From the foregoing disclosure, it will be appreciated that example scanners and scanner housings disclosed herein provide an image scanner that is thinner (e.g., less thick) than known image scanners. Example scanners and scanner housings disclosed herein also enable the use of relatively inexpensive materials and manufacturing techniques to produce scanner housings for image scanners while reducing the thickness of the image scanner and/or the flatness of the image scanner.

Although certain example apparatus, printers, and methods have been described herein, the scope of coverage of this patent is not limited thereto. On the contrary, this patent covers all methods and apparatus fairly falling within the scope of the claims of this patent.

What is claimed is:

1. A scanner, comprising:
   a housing to carry an optical element, the housing having a first support feature; and a printed circuit board having a second support feature to mate with the first support feature of the housing, the first and second support features to reduce a vertical load on the housing by transferring a portion of the vertical load to the printed circuit board when the first and second support features are mated.

2. A scanner as defined in claim 1, wherein the printed circuit board comprises an optical component for an image scanner.

3. A scanner as defined in claim 1, wherein a first one of the first support feature or the second support feature comprises a tab and the other of the first support feature or the second support feature comprises a slot to receive the tab.

4. A scanner as defined in claim 1, wherein the first support feature is one of at least three tabs, and the second support feature is one of at least three slots, the at least three slots to mate with the at least three tabs.

5. A scanner as defined in claim 4, wherein the tabs and the slots are to mate to transfer the portion of the vertical load from the housing to the printed circuit board.

6. A scanner as defined in claim 1, wherein the housing and the printed circuit board have a vertical height less than about 6 millimeters.

7. A scanner as defined in claim 1, wherein the first support feature comprises a first slot and the second support feature comprises a second slot, the first and second support features to be joined by a fastener.

8. A scanner as defined in claim 1, wherein the first support feature and the second support feature are to remain mated in response to thermal expansion or thermal contraction of the housing or the printed circuit board.

9. A scanner as defined in claim 1, wherein the housing comprises at least one of thermoplastic or thermoset plastic.

10. A scanner as defined in claim 1, wherein the first support feature is dimensioned to permit the second support feature to move laterally while substantially maintaining a flatness of the housing.

11. A scanner, comprising:
a housing to carry an optical element; and
a printed circuit board having a first intrinsic stiffness in a first direction and a second intrinsic stiffness in a second direction perpendicular to the first direction, the second intrinsic stiffness being less than the first intrinsic stiffness, the printed circuit board to mate with the housing such that the printed circuit board provides support to the housing in the first direction.

12. A scanner as defined in claim 11, wherein the printed circuit board comprises an optical component for an image scanner.

13. A scanner as defined in claim 11, wherein the housing and the printed circuit board are to mate to transfer at least a portion of a load in the first direction from the housing to the printed circuit board.

14. A scanner as defined in claim 11, wherein the housing and the printed circuit board have a vertical height less than about 6 millimeters.

15. A scanner as defined in claim 11, wherein the housing and the printed circuit board are to remain mated in response to thermal expansion or thermal contraction of the housing or the printed circuit board.

16. A scanner as defined in claim 11, wherein the housing comprises at least one of thermoplastic or thermoset plastic.

17. A scanner as defined in claim 11, wherein the housing and the printed circuit board are mated such that printed circuit board is permitted to move laterally while substantially maintaining a flatness of the housing.

18. A scanner as defined in claim 11, wherein the first direction is more vertical than horizontal.

19. A scanner, comprising:
a housing to carry an optical element, the housing comprising three first support features; and
a printed circuit board comprising three second support features to respectively mate with the first support features of the housing, the first and second support features to reduce a vertical load on the housing by transferring a portion of the vertical load to the printed circuit board when the first and second support features are mated.

20. A scanner as defined in claim 19, wherein the three first support features are three tabs, and the three second support features are slots, the slots to mate with the tabs.

* * * * *

UNITED STATES PATENT AND TRADEMARK OFFICE
CERTIFICATE OF CORRECTION

| | |
|---|---|
| PATENT NO. | : 8,964,258 B2 |
| APPLICATION NO. | : 13/222976 |
| DATED | : February 24, 2015 |
| INVENTOR(S) | : Edward A. Hill et al. |

It is certified that error appears in the above-identified patent and that said Letters Patent is hereby corrected as shown below:

IN THE CLAIMS

In column 8, line 23 approx., in Claim 17, delete "that" and insert -- that the --, therefor.

Signed and Sealed this
Twelfth Day of January, 2016

Michelle K. Lee
*Director of the United States Patent and Trademark Office*